US011974965B2

(12) United States Patent
Gift et al.

(10) Patent No.: US 11,974,965 B2

(45) Date of Patent: May 7, 2024

(54) PEDIATRIC DOSING DISPENSER

(71) Applicant: Berry Global, Inc., Evansville, IN (US)

(72) Inventors: Steven Gift, Lititz, PA (US); Michael M. Makhlouf, Lititz, PA (US); Jacob B. Robison, Marietta, PA (US); Brian Martin, New Providence, PA (US); John A. Vassallo, Lititz, PA (US)

(73) Assignee: Berry Global, Inc., Evansville, IN (US)

( * ) Notice: Subject to any disclaimer, the term of this patent is extended or adjusted under 35 U.S.C. 154(b) by 469 days.

(21) Appl. No.: 17/406,363

(22) Filed: Aug. 19, 2021

(65) Prior Publication Data

US 2021/0378914 A1 Dec. 9, 2021

Related U.S. Application Data

(63) Continuation of application No. 16/806,424, filed on Mar. 2, 2020, now Pat. No. 11,116,693.

(60) Provisional application No. 62/818,898, filed on Mar. 15, 2019.

(51) Int. Cl.

| | |
|---|---|
| ***A61J 1/14*** | (2023.01) |
| ***B65D 50/04*** | (2006.01) |
| ***B65D 50/06*** | (2006.01) |
| *A61J 1/20* | (2006.01) |

(52) U.S. Cl.

CPC .......... *A61J 1/1418* (2015.05); *B65D 50/045* (2013.01); *B65D 50/069* (2013.01); *A61J 1/2037* (2015.05); *A61J 1/2051* (2015.05); *B65D 2215/02* (2013.01)

(58) Field of Classification Search

CPC ...... A61J 1/1418; A61J 1/1412; A61J 1/2037; A61J 1/202; A61J 1/2051; A61J 1/2048; B65D 50/045; B65D 50/069; B65D 50/067; B65D 50/046; B65D 50/041

USPC ........ 220/202, 203.19, 203.01, 257.1, 256.1, 220/254.8, 254.1; 215/311, 307, 228, 215/251, 250, 217, 201

See application file for complete search history.

(56) References Cited

U.S. PATENT DOCUMENTS

| | | | |
|---|---|---|---|
| 4,022,352 | A | 5/1977 | Pehr |
| 5,205,431 | A | 4/1993 | Zinnbauer |
| 5,213,235 | A | 5/1993 | Renato |
| 5,356,017 | A | 10/1994 | Rohr |
| 6,866,164 | B2 | 3/2005 | Branson |

(Continued)

FOREIGN PATENT DOCUMENTS

| | | | |
|---|---|---|---|
| EP | 1424292 | A1 | 6/2004 |
| WO | 2008065879 | A1 | 6/2008 |

(Continued)

OTHER PUBLICATIONS

International (PCT) Search Report and Written Report for PCT/US22/42150 dated Nov. 23, 2022, 12 pages.

(Continued)

*Primary Examiner* — Robert J Hicks

(74) *Attorney, Agent, or Firm* — Barnes & Thornburg LLP

(57) ABSTRACT

A package that is configured to store and dispense fluids. The package includes a container and a dosing dispenser for closing an opening to the container. The dosing dispenser includes a closure removably coupled to the container and an anti-suction valve fixed to the container that is configured to minimize formation of a complete seal between a user's mouth and an upper surface of the anti-suction valve so that sufficient suction to remove fluid from the container is blocked.

20 Claims, 6 Drawing Sheets

(56) References Cited

U.S. PATENT DOCUMENTS

| | | | |
|---|---|---|---|
| 7,568,509 | B2 | 8/2009 | Py |
| 8,211,082 | B2 | 7/2012 | Hasegawa |
| 8,272,411 | B2 | 9/2012 | Py |
| 9,156,569 | B2 | 10/2015 | Vassallo |
| 9,296,531 | B2 | 3/2016 | Luzbetak |
| 9,849,067 | B2 | 12/2017 | Vassallo |
| 9,884,706 | B1 | 2/2018 | Skillin |
| 10,689,169 | B1 | 6/2020 | Meshberg |
| 11,242,185 | B2 | 2/2022 | Marantis |
| 2003/0201283 | A1 | 10/2003 | Branson |
| 2005/0133475 | A1 | 6/2005 | Goto |
| 2005/0178462 | A1 | 8/2005 | Py |
| 2007/0084524 | A1 | 4/2007 | Py |
| 2007/0144996 | A1 | 6/2007 | Sawyer |
| 2010/0063473 | A1 | 3/2010 | Schwarz |
| 2010/0089861 | A1 | 4/2010 | Rutter |
| 2010/0154245 | A1 | 6/2010 | Py |
| 2015/0112296 | A1 | 4/2015 | Ishiwata |
| 2021/0276769 | A1 | 9/2021 | Dzurik |

FOREIGN PATENT DOCUMENTS

| | | | |
|---|---|---|---|
| WO | 2009133754 | A1 | 11/2009 |
| WO | 2013003293 | | 1/2013 |
| WO | 2019090079 | A1 | 5/2019 |
| WO | 2020131669 | A1 | 6/2020 |

OTHER PUBLICATIONS

Office Action dated Sep. 27, 2019 for U.S. Appl. No. 15/835,523 (pp. 1-8).

International (PCT) Search Report and Written Opinion for PCT/US23/19233 dated Jul. 19, 2023, 9 pages.

Office Action (Non-Final Rejection) dated Feb. 18, 2022 for U.S. Appl. No. 16/806,462, (pp. 1-9).

Indian First Examination Report for Indian Patent App. No. 202117040342 dated Jan. 12, 2023, 6 pages.

European Search Report for European App. No. EP20766543.1 dated Jan. 24, 2023, 9 pages.

First Chinese Office Action for Chinese Patent App. No. 202080032881.9 dated Feb. 11, 2023, 14 pages.

PEDIATRIC DOSING DISPENSER

PRIORITY CLAIM

This application is a continuation of U.S. application Ser. No. 16/806,424, filed Mar. 2, 2020, which claims priority under 35 U.S.C. § 119(e) to U.S. Provisional Application No. 62/818,898, filed Mar. 15, 2019, each of which is expressly incorporated by reference herein.

BACKGROUND

The present disclosure relates to a package configured to store and dispense fluids, and in particular, to a package including a container and a closure coupled to the container to close selectively an opening formed in the container. More particularly, the present disclosure relates to a package including a container and a dosing dispenser coupled to the container to close selectively an opening formed in the container.

SUMMARY

According to the present disclosure, a package includes a container and a dosing dispenser configured to mount to a filler neck of the container to control release of product from the container via a syringe.

In illustrative embodiments, the dosing dispenser includes a closure coupled removably to the filler neck and having an inner cap configured to mount to the filler neck and an outer cap coupled to the inner cap. The outer cap is rotatable relative to the inner cap in a child-resistant locked position. The closure is configured to change from the locked position to an unlocked position in response to an unlocking force applied on the outer cap by a user to cause the inner cap to rotate with the outer cap to remove the closure from the filler neck.

In illustrative embodiments, the dosing dispenser further includes an anti-suction valve mounted to the filler neck to cover a mouth of the container. The anti-suction valve includes a lower surface located below the mouth between the body and the mouth, an upper surface located at or above the mouth, and a fluid passageway that extends from the upper surface to the lower surface to open into an interior product-storage region of the container. The anti-suction valve includes a plurality of airflow recesses that are arranged to extend between the lower surface and the upper surface. The airflow recesses are configured to minimize formation of a complete seal between a child's mouth and the upper surface so that sufficient suction to remove fluid through the fluid passageway is blocked.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

Figure 5:
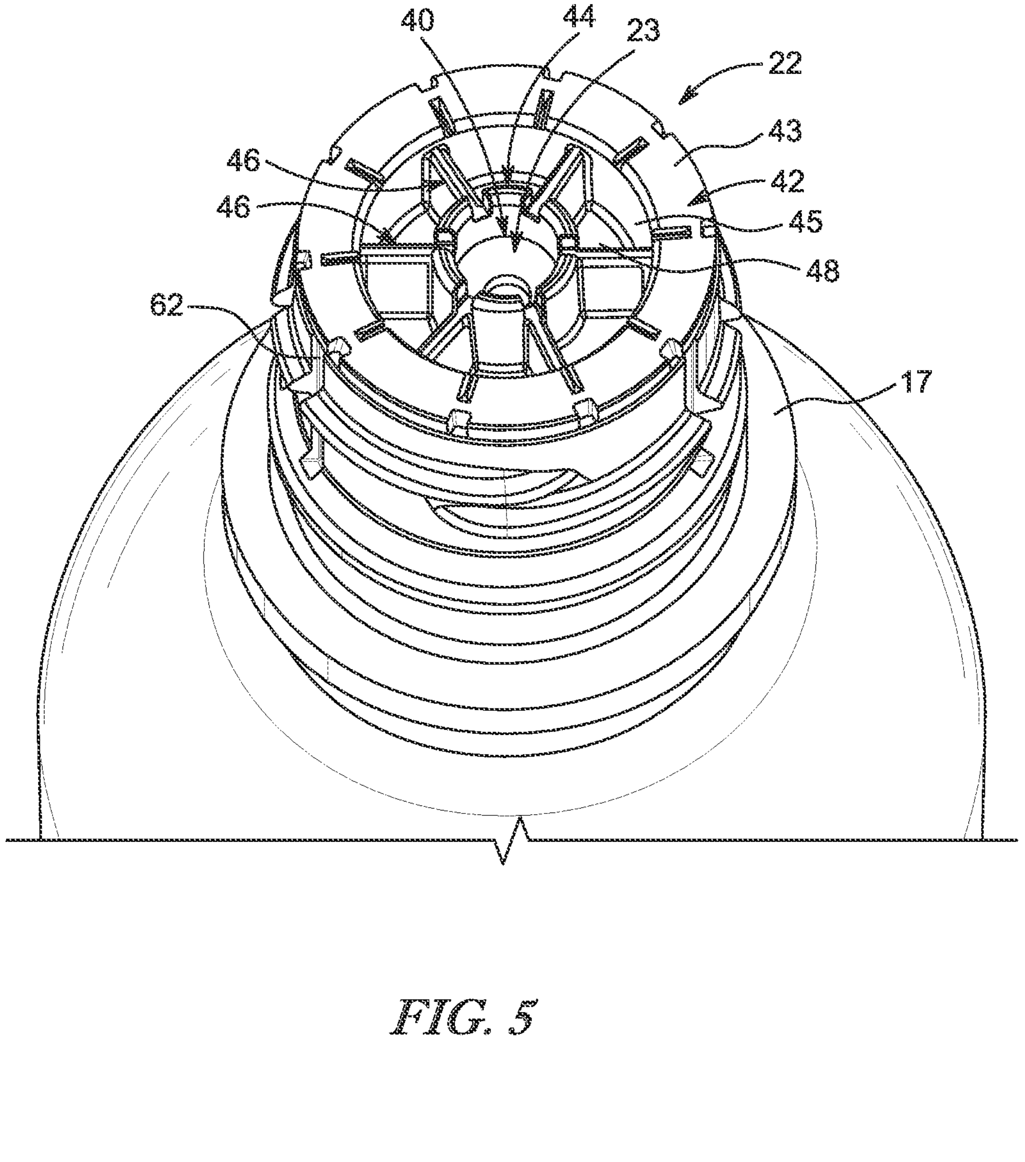
Figure 6:
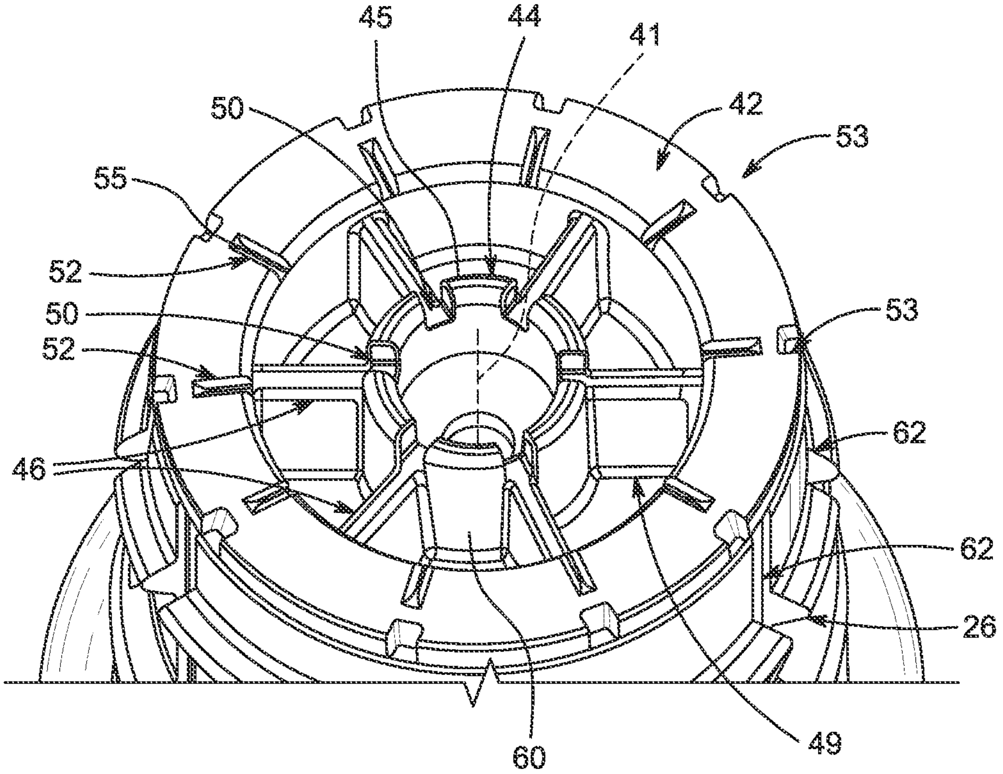
Figure 7:
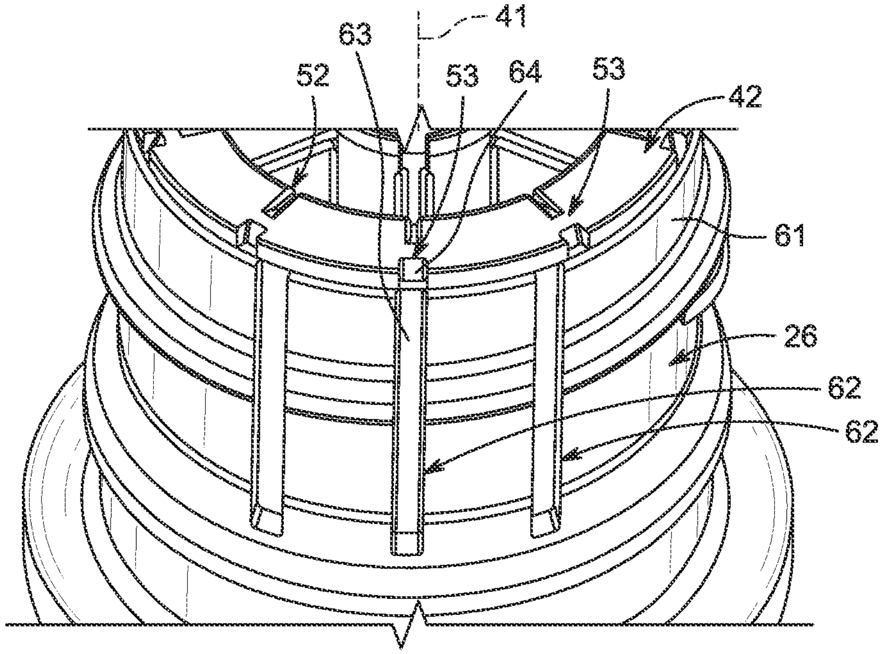

FIG. 5 is an enlarged perspective view of the anti-suction valve coupled to the filler neck showing that the anti-suction valve includes an outer perimeter ring, an inner central ring, a plurality of ribs interconnecting the outer perimeter ring and the inner central ring and a base plate, and suggesting that the plurality of ribs are spaced apart circumferentially from one another to provide a plurality of airflow recesses therebetween;

FIG. 6 is a perspective view of the anti-suction valve showing that the inner central ring and the outer perimeter ring are formed to include a plurality of radially extending slots that block a complete seal from forming if a user attempts to apply a suction force on the anti-suction valve; and FIG. 7 is a perspective view of a portion of the anti-suction valve and the filler neck showing that the filler neck is formed to include a plurality of slots, at least one of the slots being aligned with one of the plurality of radially extending slots of the outer perimeter ring so as to block a complete seal from forming if a user attempts to apply a suction force on the filler neck.

DETAILED DESCRIPTION

Figure 1:
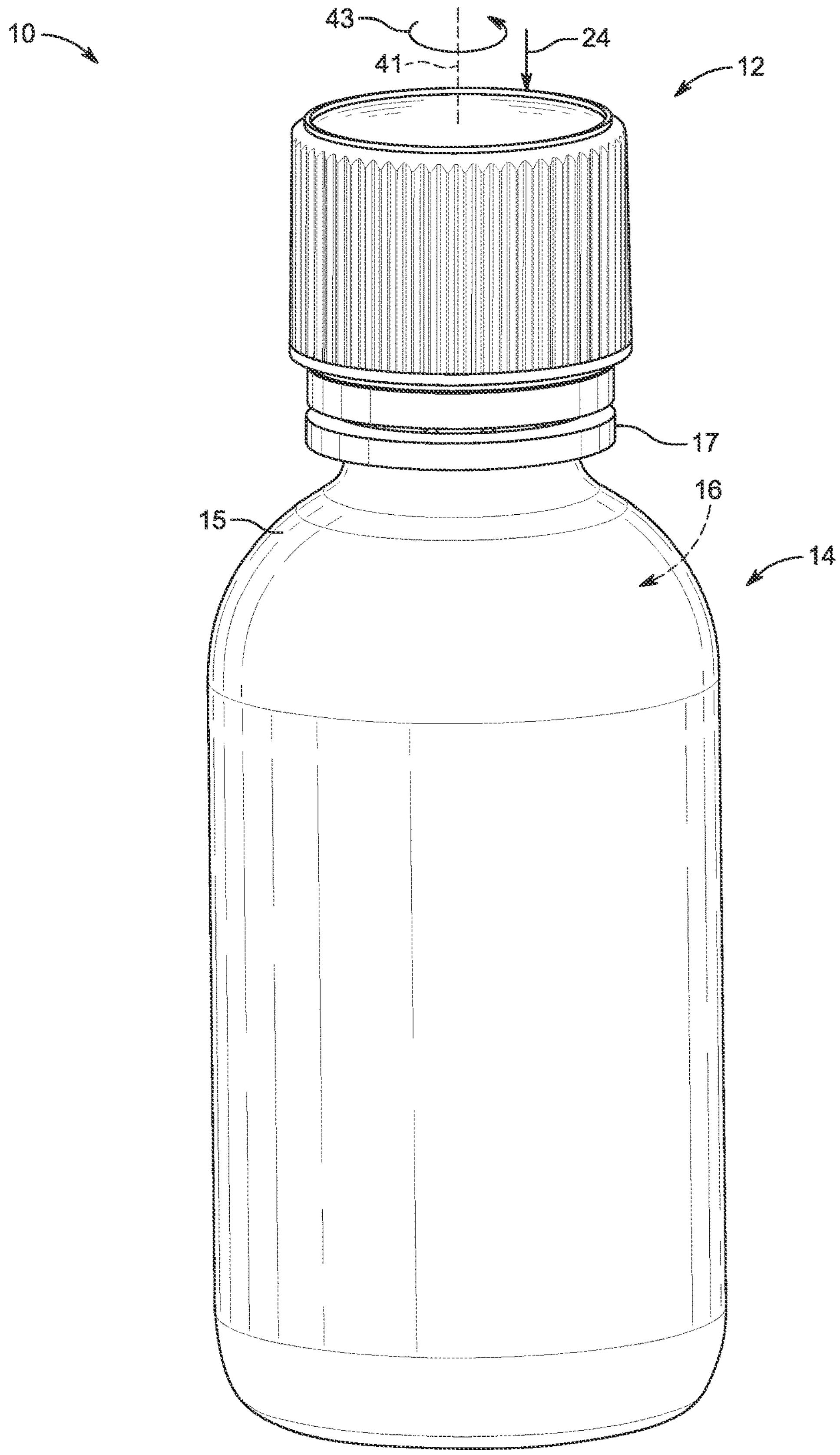
FIG. 1 is a perspective view of a package in accordance with the present disclosure showing that the package includes a container and a dosing dispenser coupled to the container and suggesting that the dosing dispenser may be rotated about a central axis to change from closed arrangement to an opened arrangement upon application of a downward force.
Figure 2:
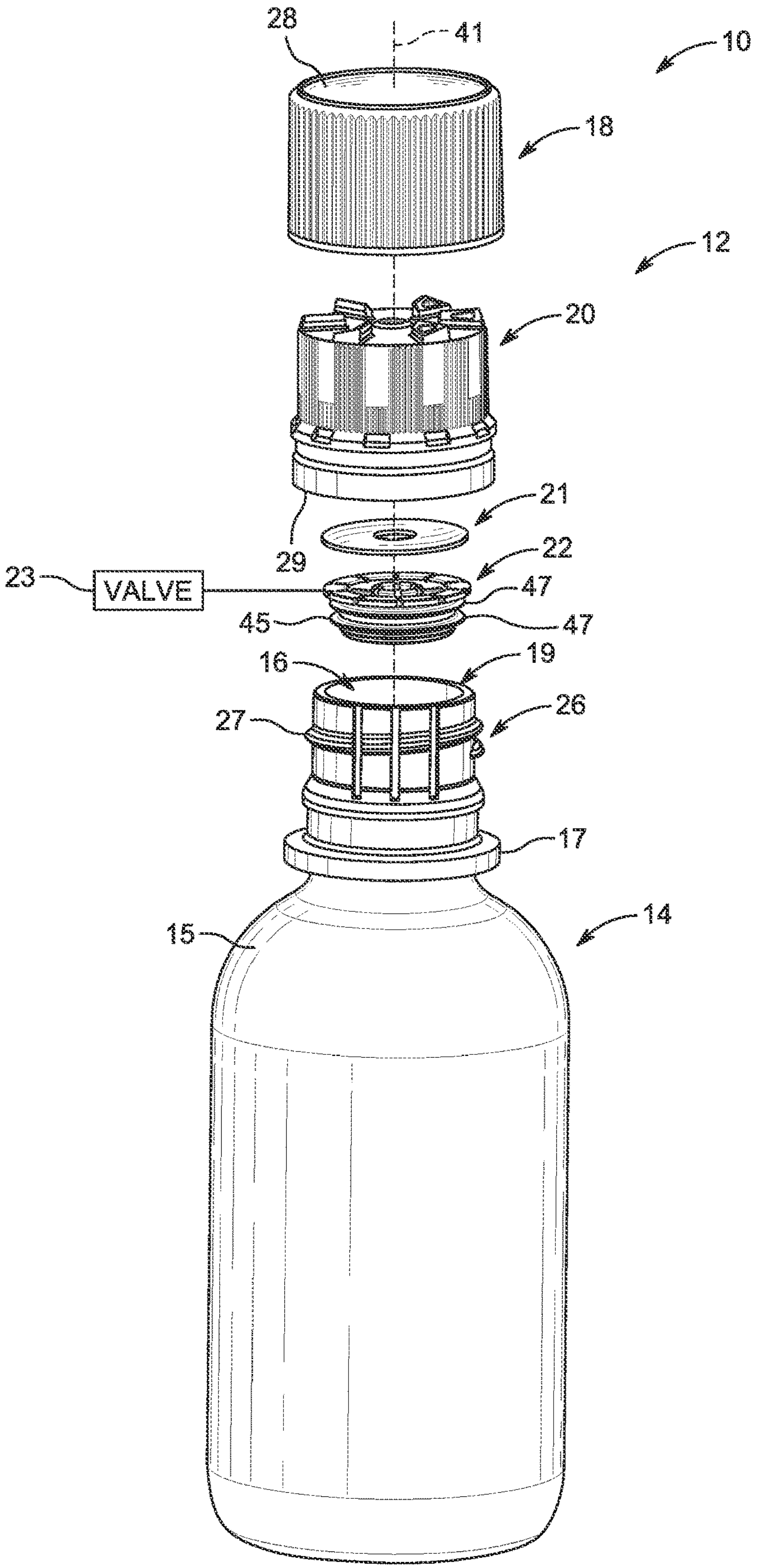
FIG. 2 is an exploded assembly view of the package of FIG. 1 showing that the package includes the dosing dispenser including an outer cap, an inner cap, a seal, and an anti-suction valve with an integrated valve, and the container below the dosing dispenser.

A package 10 in accordance with the present disclosure is shown in FIGS. 1 and 2. The package 10 includes a dosing dispenser 12 and a container 14. The dosing dispenser 12 is coupled to the container 14 to selectively block movement of fluid stored in an interior product-storage region 16 of the container 14. The dosing dispenser 12 may be changed from a closed arrangement in which fluid flow is blocked to an opened arrangement in which fluid flow from the product-storage region 16 is permitted.

Figure 4:
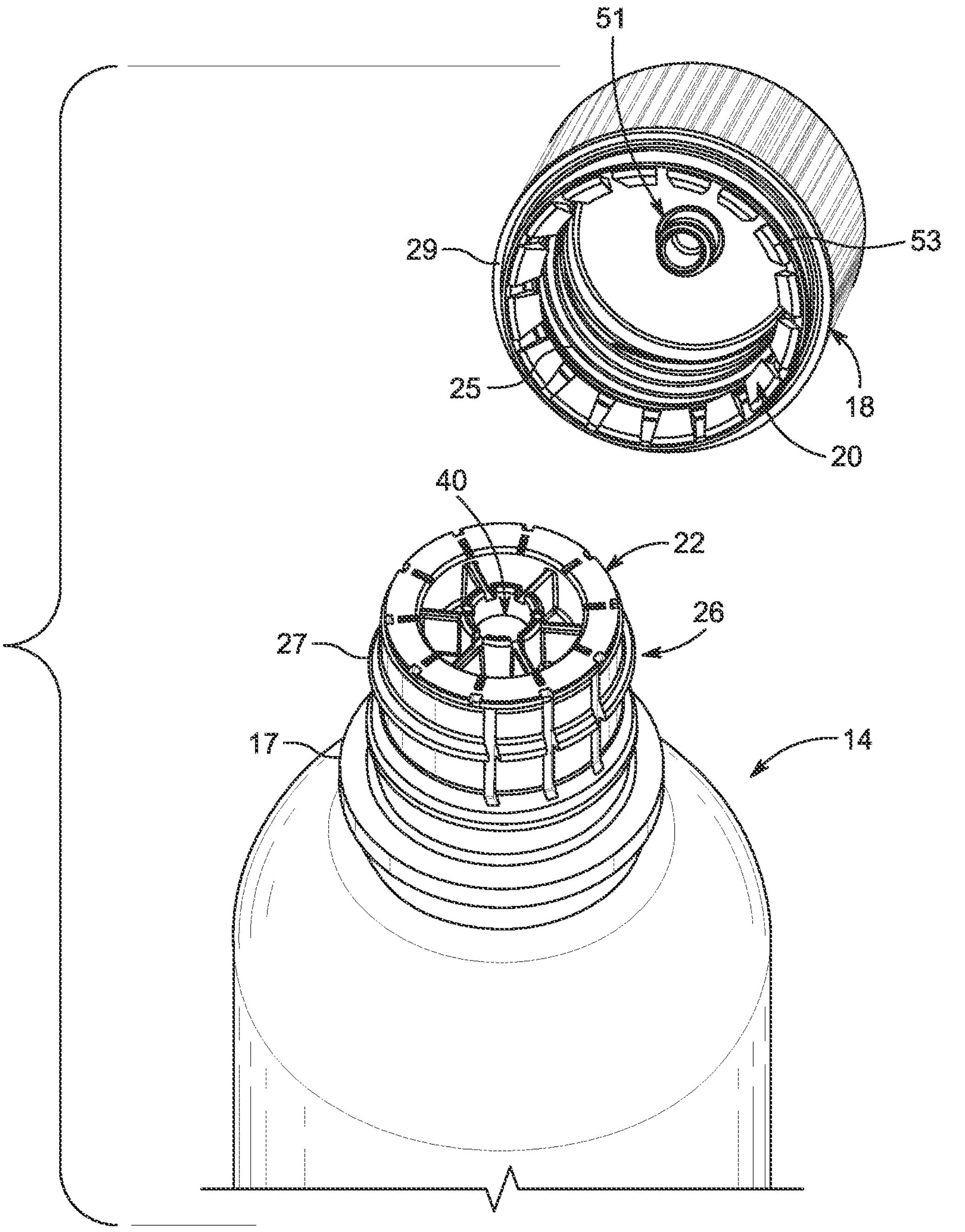
FIG. 4 is an enlarged perspective view of the package with the inner and outer caps removed to show the anti-suction valve fixed to a filler neck of the container.

The dosing dispenser 12 includes an outer cap 18, an inner cap 20, and an anti-suction valve 22 as shown in FIGS. 1 and 2. The outer cap 18, the inner cap 20, and the anti-suction valve 22 provide a child-resistant closure. The outer cap 18 and the inner cap 20 cooperate to block selectively removal of the outer cap 18 and the inner cap 20 until a user applies a downward force 24 and rotates the outer cap 18 in a counterclockwise direction 43 about a central axis 41 as suggested in FIG. 1. The anti-suction valve 22 remains fixed to a filler neck 26 of the container 14 when the outer cap 18 and the inner cap 20 are removed, as shown in FIG. 4, and is configured to block a user, such as a child, from creating a sufficient suction force that could remove a liquid product from the container 14. The dosing dispenser 12 may further include a seal 21 coupled to the inner cap 20 and a valve 23 coupled to the anti-suction valve 22 to selectively block removal of a liquid product from the container 14.

Figure 3:
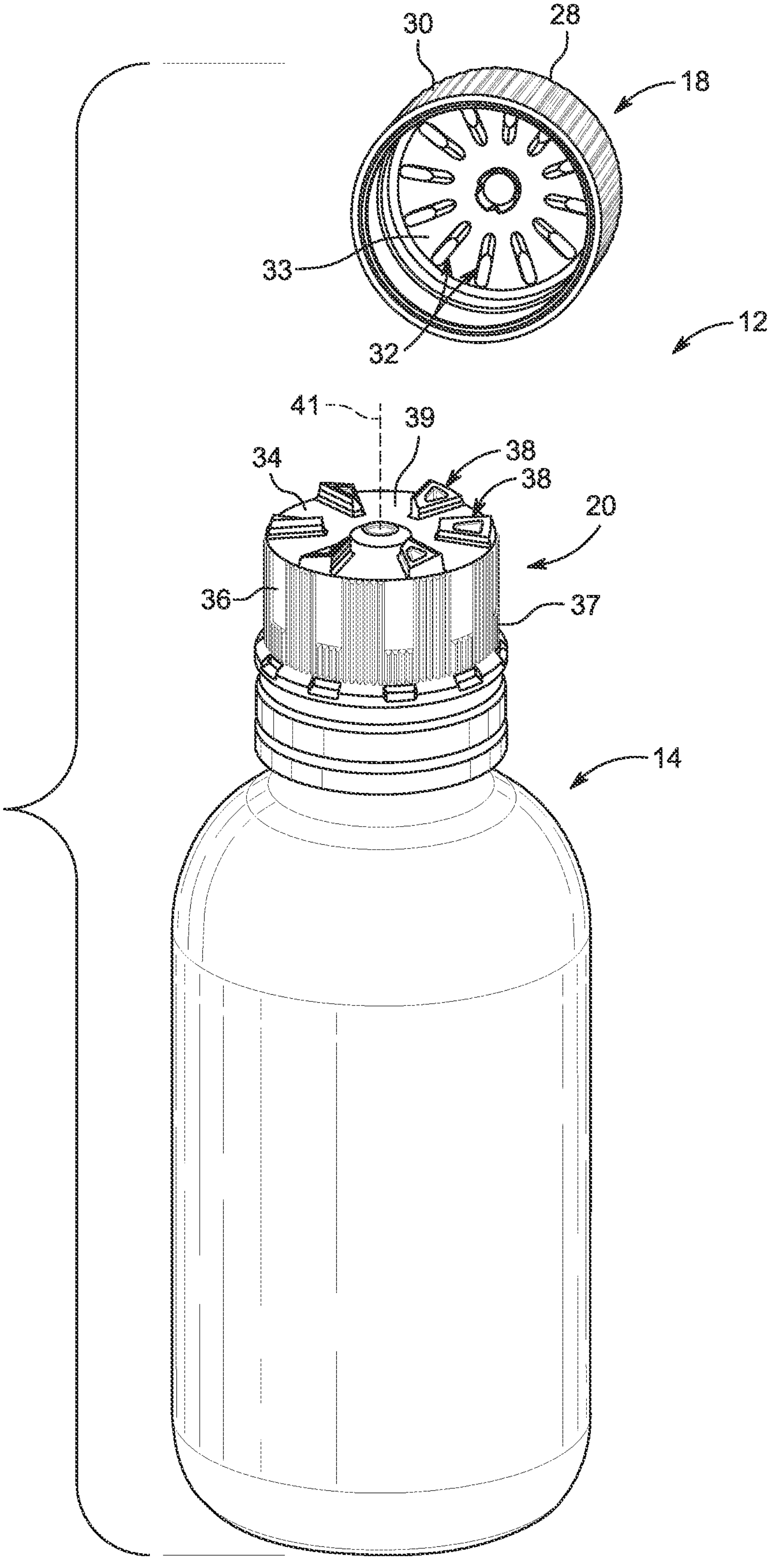
FIG. 3 is a perspective and partial exploded view of the package of FIGS. 1 and 2 showing that the outer cap includes engagement tabs and the inner cap includes corresponding engagement ridges that are configured to interlock with the engagement tabs so that the inner cap may be rotated by the outer cap in response to a downward unlocking force applied to the outer cap by a user.

The container 14 is generally cylindrically shaped and includes a transition portion 15 that tapers from an outer circumferential surface of the container to the filler neck 26 as shown in FIGS. 1-3. The filler neck 26 is also generally cylindrically shaped and includes an outer rib 17 that surrounds an outer circumferential surface of the filler neck 26. The outer rib 17 is arranged such that a top surface of the rib 17 is annularly aligned with a bottom rim 29 of the inner cap 20 of the dosing dispenser 12 when the inner cap 20 is coupled to the filler neck 26. In other embodiments, the container 14 and filler neck 26 is be shaped differently, so long as the inner cap 20 and the anti-suction valve 22 are capable of being coupled to a mouth 19 of the filler neck 26 of the container 14.

The inner cap 20 of the disposing dispenser 12 is coupled to the filler neck 26 of the container 14 via a threaded arrangement as shown in FIGS. 2 and 4. In particular, the filler neck 26 includes at least one first thread 27 that extends around the circumference of the filler neck 26, and the inner cap 20 includes at least one second thread 25 that corresponds to the at least one first thread 27 such that the inner cap 20 may be screwed onto the filler neck 26. The inner cap 20 may be screwed onto the filler neck 26 until the bottom rim 29 of the inner cap 20 touches, or nearly touches, the outer rib 17 of the filler neck 26. In other embodiments, the inner cap 20 may be coupled to the filler neck 26 using other methods, such as press fitting or adhesives.

As can be seen in FIGS. 1-3, the outer cap 18 includes an outer top wall 28, an annular outer side wall 30, and a plurality of engagement tabs 32 coupled to an inner surface 33 of the outer top wall 28. The outer top wall 28 is generally circular and is sized to have a diameter that slightly larger than a diameter of the inner cap 20. The outer side wall 30 extends axially from a circumferential edge of the outer top wall 28 so as to be concentric with the outer top wall 28 about the central axis 41. The outer side wall 30 extends away from the outer top wall 28 approximately the same distance as a height of the inner cap 20.

The outer side wall 30 is knurled to provide a gripable surface to allow a user to effectively rotate the outer cap 18 in order to turn the inner cap 20 and subsequently remove the inner cap 20 and the outer cap 18 from the container 14. The outer side wall 30 may include ridges, as shown in FIGS. 1-4, ribs, or any other surfaces that would provide a gripable surface for a user.

The plurality of engagement tabs 32 extend axially away from the inner surface 33 of the outer top wall 28 as shown in FIG. 3. The plurality of engagement tabs 32 extend away from the inner surface 33 a distance that is slightly less than a distance which a user must push down on the outer cap 18 in order to engage a plurality of engagement ridges 38 of the inner cap 20, as will be discussed in detail below. In the illustrative embodiment, the outer cap 18 includes twelve (12) engagement tabs 32 spaced evenly circumferentially around the inner surface 33. However, in other embodiments, the number of engagement tabs 32 arranged on the inner surface 33 may be more or less, so long as the engagement tabs 32 are capable of engaging the engagement ridges 38 of the inner cap 20 so as to decouple the inner cap 20 and the outer cap 18 from the container 14. In some embodiments, the engagement tabs 32 are integrally formed with the inner surface 33 so as to form a single, monolithic component. In other embodiments, the engagement tabs 32 are separate components that are subsequently joined with the inner surface 33.

The inner cap 20 includes an inner top wall 34 and an annular inner side wall 36 extending axially away from the inner top wall 34, as shown in FIGS. 2 and 3. The inner top wall 34 is generally circular and is sized to have a diameter that is slightly smaller than a diameter of the outer cap 18 and slightly larger than the mouth 19 of the filler neck 26 so as to fit around the filler neck 26 when coupling the inner cap 20 to the container 14. The inner side wall 36 extends axially from the circumferential edge of the inner top wall 34 so as to be concentric with the inner top wall 34 about the central axis 41. The inner side wall 36 extends away from the inner top wall 34 approximately the same distance as the distance that the outer side wall 30 extends away from the outer top wall 28.

The inner side wall 36 may include a plurality of tactile indicators 37 that extend radially outwardly from the inner side wall 36. The tactile indicators 37 may include ridges, as shown in FIG. 3, and are configured to engage with an inner surface of the outer side wall 30 of the outer cap 18 when the outer cap 18 is rotated relative to the inner cap 20. The engagement of the tactile indicators 37 with the inner surface of the outer side wall 30 alerts a user that the outer cap 18 is rotating relative to the inner cap 20, and as such, an additional force 24 may need to be applied to the outer cap 18 in order to engage the plurality of engagement ridges 38 and the engagement tabs 32.

The plurality of engagement ridges 38 are coupled to an outer surface 39 of the inner top wall 34 and extend axially away from the outer surface 39 as shown in FIG. 3. In the illustrative embodiment, the inner cap 20 includes six (6) engagement ridges 38 that are all sloped in the same circumferential direction. Accordingly, two engagement tabs 32 of the outer cap 18 are configured to fit in the space defined between two adjacent engagement ridges 38 although in other embodiments a different arrangement may be used.

To change the dosing dispenser 12 from the closed arrangement, in which the dosing dispenser 12 is arranged on the filler neck 26, to the opened arrangement, in which the dosing dispenser 12 is removed from the filler neck 26, a user must apply a downward force 24 in order to move the outer cap 18 and the inner cap 20 from a locked position to an unlocked position. In the locked position, the plurality of engagement tabs 32 of the outer cap 18 may not be engaged with the plurality of engagement ridges 38 of the inner cap 20, thus allowing the outer cap 18 to rotate freely relative to the inner cap 20. If the outer cap 18 were rotated about axis 41 in the locked position, the engagement tabs 32 may slide over the sloped surfaces of the engagement ridges 38 and the outer cap 18 would rotate relative to the inner cap 20.

In the unlocked position, after a user applies a downward force 24 on the outer cap 18, the plurality of engagement tabs 32 are moved downward past the sloped surfaces and interlock with the plurality of engagement ridges 38 so that the inner cap 20 may be rotated counterclockwise by the outer cap 18 rotating counterclockwise. After the inner cap 20 is rotated, the inner cap 20 and outer cap 18 may be removed from the filler neck 26, exposing a fluid passageway 40 of the anti-suction valve 22. In the illustrative embodiment, the inner cap 20 includes resilient members 53 that are configured to push the outer cap 18 back to its original, locked position, when a user is not applying a downward force 24 to the outer cap 18. In some embodiments, the top wall 28 of the outer cap 18 includes instructions, as shown in FIGS. 1 and 2, instructing the user that the outer cap 18 must be pushed downward and rotated counterclockwise in order to remove the outer and inner caps 18, 20.

With the outer and inner caps 18, 20 removed, the liquid product may be retrieved from the container 14 as suggested in FIG. 4. In the illustrative embodiment, the package 10 is configured for use with a syringe device (not shown) that is placed over the fluid passageway 40 formed by an inner central ring 44 of the anti-suction valve 22 described below, and then used remove the liquid product by suction. The fluid passageway 40 is formed in the anti-suction valve 22 which is configured to block sufficient suction from forming unless the syringe device is attached and used to provide the suction. The valve 23 is included within the flow passageway 40 in order to block flow from exiting the container 14 as shown in FIGS. 2 and 5. The valve 23 may be configured as a one-way valve so as to block flow of fluid through the flow passageway 40 absent a sufficient suction force, such as by a syringe. In the illustrative embodiment, the inner cap 20 further includes a plug 51 that is received in the fluid passageway 40 when the inner cap 20 is in the closed arrangement to block flow of liquid product from the interior region 16 of the container 14.

The anti-suction valve 22 includes an annular outer perimeter ring 42 defining an upper surface of the anti-suction valve 22, an annular inner central ring 44, and a plurality of ribs 46 as shown in FIGS. 2 and 4-7. The outer perimeter ring 42 and the inner central ring 44 are concentric with each other and the central axis 41. As can be seen in FIGS. 2 and 5, the outer perimeter ring 42 includes an outer ring rim 43, an outer ring body 45, and an outer ring floor 48 defining a lower surface of the anti-suction valve 22.

The outer ring body 45 is annular and extends axially away from an inner edge of the outer ring rim 43. In the illustrative embodiment, the outer ring rim 43 extends radially beyond the outer ring body 45 such that the outer ring rim 43 extends over and contacts the top surface of the filler neck 26 when the anti-suction valve 22 is arranged in the filler neck 26, as shown in FIGS. 2 and 4-7.

In some embodiments, the outer ring body 45 includes a plurality of annular ribs 47 that are configured to press against an inner surface of the filler neck 26 of the container 14 in order to secure the anti-suction valve 22 in the filler neck 26. The plurality of annular ribs 47 may be formed of a resilient material that has a sufficiently large enough modulus of elasticity to hold the anti-suction valve 22 in place in the filler neck 26 after the anti-suction valve 22 is inserted into the neck 26.

The outer ring floor 48 of the anti-suction valve 22 forms a base of the valve 22, and may be axially located at the bottom of the outer ring body 45 or at an axially intermediate point along the outer ring body 45. The inner central ring 44 is arranged to extend away from the outer ring floor 48 a distance approximately equal to an axial distance between the outer ring floor 48 and the outer ring rim 43. In the illustrative embodiment, the outer ring floor 48 includes an aperture that is concentric with the central axis 41 as shown in FIG. 6. In some embodiments, the aperture formed in the outer ring floor 48 may be smaller than the diameter of the fluid passageway 40 in order to allow less liquid product to flow therethrough, or in order to accommodate different valves 23.

The plurality of ribs 46 extend between the outer ring rim 43 and the inner central ring 44 along the outer ring floor 48 to locate the inner central ring 44 relative to the outer ring rim 43 as shown in FIGS. 5 and 6. The outer ring floor 48 is coupled beneath the plurality of ribs 46 to block access into the interior region 16 of the container 14 between outer perimeter ring 42 and the inner central ring 44 such that the fluid passageway 40 is the only opening into the internal region 16. As can be seen in FIGS. 4-7, the plurality of ribs 46 are spaced apart circumferentially from each other and about the central axis 41. Accordingly, each pair of adjacent ribs 46 defines an airflow recess 49 therebetween. As such, the anti-suction valve 22 includes a plurality of airflow recesses 49 defined between the plurality of ribs 46.

In the illustrative embodiment, the inner central ring 44 includes an inner ring rim 58 defining an inlet aperture that opens into the fluid passageway 40 and an inner ring body 60 that extends axially between the inner ring rim 58 and the outer ring floor 48 as shown in FIG. 6. The inner ring rim 58 is formed to include a first plurality of slots 50 disposed circumferentially around the inner ring rim 58. The first plurality of slots 50 open in a radial direction relative to the central axis 41. In particular, as seen in FIGS. 5 and 6, the first plurality of slots 50 extend from the fluid passageway 40 to an outer edge of the inner ring body 60.

Each first slot 50 of the first plurality of slots 50 is aligned with a corresponding one of the plurality of ribs 46 as shown in FIG. 6. Each first slot 50 is as deep as the thickness of the inner ring rim 58 such that the lower surface of the first slot 50 is flush with the top surface of a corresponding rib 46. In other embodiments, the lower surface of the first slot 50 may be lower or higher than the top surface of a corresponding rib 46. As can also be seen in FIG. 6, the height of the plurality of ribs 46 is lower than an upper surface defined by the top of the outer ring rim 43 and an upper surface defined by the top of the inner ring rim 58. The upper surfaces of the outer and inner ring rims 43, 58 may be co-planar with each other, as shown in FIGS. 2 and 4-7, or may be slightly offset. The plurality of ribs 46 have height that arranges an upper surface of each rib 46 above or below the two upper surfaces of the outer and inner ring rims 43, 58.

In the illustrative embodiment, the outer ring rim 43 is formed to include a first plurality of channels 52 that are spaced circumferentially around the central axis 41 as shown in FIG. 6. The first plurality of channels 52 extend from an inner edge of the outer ring rim 43 that bounds the plurality of airflow recesses 49 toward an outer edge of the outer ring rim 43. Each first channel 52 includes a lower surface 55 that is formed to slope upwardly from the inner edge of the outer ring rim 43 to a termination point of the channel 52 between inner and outer edges of the outer ring rim 43.

The first plurality of channels 52 includes ten (10) individual channels 52, as shown in FIGS. 4-7, although more or less may be included so long as the channels 52 provide sufficient anti-suction effects. The first plurality of channels 52 extend only partly between the inner edge and the outer edge of the outer ring rim 43, as shown in FIGS. 5-7. In other embodiments, the first plurality of channels 52 extend fully between the inner and outer edges of the outer ring rim 43. In some embodiments, a depth of the channels 52 and/or the number of channels 52 may be increased or decreased.

The outer ring rim 43 is further formed to include a second plurality of channels 53 that are spaced circumferentially around the central axis 41 as shown in FIGS. 4-7. The second plurality of channels 53 extend from the outer edge of the outer ring rim 43 toward the inner edge of the outer ring rim 43. As shown in FIGS. 5-7, the second plurality of channels 53 extend completely through the outer ring rim 43 in an axial direction relative to axis 41. The second plurality of channels 53 do not radially extend beyond a point at which the outer ring rim 43 contacts the top surface of the filler neck 26 so that liquid product cannot escape through the second channels 53. In some embodiments, the depth of the channels 53 may be increased or decreased.

The second plurality of channels 53 includes ten (10) individual channels 53 that are each aligned with a respective channel 52 of the first plurality of channels 52 as shown in FIGS. 5-7. In other embodiments, more or less second channels 53 may be included so long as the channels 53 provide sufficient anti-suction effects. Moreover, in some embodiments, a different number of first channels 52 than second channels 53 are be included on the outer ring rim 43. In at least one embodiment, at least one first channel 52 of the first plurality of channels 52 is not aligned with at least one second channel 53 of the second plurality of channels 53.

In the illustrative embodiment, the filler neck 26 includes a second plurality of slots 62 that are formed in an outer surface 61 of the filler neck 26 and that extend axially relative to the central axis 41, as shown in FIGS. 5-7. At least one of the second plurality of channels 53 formed in the outer ring rim 43 is aligned with a corresponding slot 62 of the second plurality of slots 62. Each slot 62 of the second plurality of slots 62 defines a depth such that a bottom surface 63 of each slot 62 is substantially aligned with a back wall 64 of a corresponding second channel 52. As can be seen in FIGS. 5-7, each slot 62 extends from the top surface of the filler neck 26, penetrates through the at least one first thread 27 of the filler neck 26, and terminates approximately at the top of the outer rib 17.

As shown in FIGS. 5-7, each slot 62 of the second plurality of slots 62 is parallel with an adjacent slot 62. In other embodiments, the slots 62 are substantially parallel but not exactly parallel such that some of the slots 62 extend away from the outer ring rim 43 at an angle. In at least one embodiment, the filler neck 26 includes three (3) slots 62 formed on one side of the outer surface 61 of the filler neck 26 and three (3) slots 62 formed on a diametrically opposite side of the filler neck 26, as shown in FIGS. 6 and 7. However, in other embodiments, the filler neck 26 may include more or less than six (6) slots 62, so long as at least one slot 62 is aligned with a corresponding second channel 53 to provide anti-suction effects. Moreover, in some embodiments, more than one or all of the slots 62 may be aligned with a corresponding second channel 53 of the second plurality of channels 53.

In operation, the package 10 provides anti-suction effects so as to restrict a user, notably a child unaware of potential dangers associated with ingestion of the liquid product inside the container 14, from removing the liquid product with her or her mouth. Specifically, if a user is able to fit the entire filler neck 26 into his or her mouth, the second plurality of channels 53 and the second plurality of slots 62 permit air to flow therethrough so that the suction provided by the user does not remove the liquid product from the container 14. In other words, the second plurality of channels 53 and the second plurality of slots 62 minimize formation of a complete seal between the user's mouth and the filler neck 26.

Moreover, if a user attempts to provide a suction force on the anti-suction valve 22, the plurality of airflow recesses 49 and/or the first plurality of slots 50 formed in the inner ring rim 58 permit air to flow therethrough so that the suction provided by the user does not remove the liquid product from the container 14. In other words, the plurality of airflow recesses 49 and/or the first plurality of slots 50 minimize the user's ability to form a complete seal between the user's mouth and the anti-suction valve 22. Even further, the plurality of airflow recesses 49 formed between the plurality of ribs 46, as well as the first plurality of channels 52 formed in the outer ring rim 43, provide additional means of allowing suction air to flow through the anti-suction valve 22. Accordingly, the plurality of airflow recesses 49 and the first plurality of channels 52 also minimize formation of a complete seal between the user's mouth and the anti-suction valve 22.

The following numbered clauses include embodiments that are contemplated and non-limiting:

Clause 1. A package comprising a container formed to include an interior product-storage region and including a body and a filler neck coupled to the body, the filler neck being formed to include a mouth arranged to open into the interior product-storage region.

Clause 2. The package of clause 1, any other clause, or combination of clauses, further comprising a dosing dispenser configured to mount to the filler neck of the container to control release of product from the interior product-storage region to a syringe.

Clause 3. The package of clause 2, any other clause, or combination of clauses, wherein the dosing dispenser includes a closure coupled removably to the filler neck and an anti-suction valve fixed to the filler neck.

Clause 4. The package of clause 3, any other clause, or combination of clauses, wherein the closure includes an inner cap configured to mount to the filler neck and an outer cap coupled to the inner cap, the outer cap being rotatable relative to the inner cap in a child-resistant locked position, the closure being configured to change from the locked position to an unlocked position in response to an unlocking force applied on the outer cap to cause the inner cap to rotate with the outer cap to remove the closure from the filler neck.

Clause 5. The package of clause 4, any other clause, or combination of clauses, wherein the anti-suction valve is mounted to the filler neck to cover the mouth and includes a lower surface located below the mouth between the body and the mouth, an upper surface located at or above the mouth, and a fluid passageway that extends from the upper surface to the lower surface to open into the interior product-storage region, Clause 6. The package of clause 5, any other clause, or combination of clauses, wherein the anti-suction valve is formed to include a plurality of airflow recesses that are arranged to extend between the lower surface and the upper surface and are configured to minimize formation of a complete seal between a child's mouth and the upper surface so that sufficient suction to remove fluid through the fluid passageway is blocked.

Clause 7. The package of clause 6, any other clause, or combination of clauses, wherein the anti-suction valve includes an outer ring engaged with the filler neck, an inner ring defining the fluid passageway and a plurality of ribs that extend radially from the central axis to interconnect the inner ring and the outer ring.

Clause 8. The package of clause 7, any other clause, or combination of clauses, wherein the plurality of ribs are spaced apart circumferentially from one another to provide the plurality of airflow recesses therebetween.

Clause 9. The package of clause 7, any other clause, or combination of clauses, wherein the outer ring includes an outer ring rim that extends circumferentially around a perimeter of the mouth, an outer ring floor that provides the lower surface of the anti-suction valve and is coupled to the inner ring, and an outer ring body that extends between the outer ring rim and the outer ring floor and engages the filler neck to retain the anti-suction valve to the filler neck.

Clause 10. The package of clause 9, any other clause, or combination of clauses, wherein the outer ring rim is formed to include a second plurality of channels that are spaced circumferentially around the central axis and that extend from the outer edge of the outer ring rim toward the inner edge of the outer ring rim.

Clause 11. The package of clause 10, any other clause, or combination of clauses, wherein the filler neck has an outer surface that is formed to include a plurality of axially-extending slots relative to the central axis and at least one of the slots included in the second plurality of channels formed in the outer ring rim is aligned with one of the axially extending slots.

Clause 12. The package of clause 9, any other clause, or combination of clauses, wherein the inner ring includes an inner ring rim defining an inlet aperture that opens into the fluid passageway and is adapted to receive a syringe and an inner ring body that extends between the inner ring rim and the outer ring floor.

Clause 13. The package of clause 12, any other clause, or combination of clauses, wherein the inner ring rim is formed to include a plurality of slots that are spaced apart from one another circumferentially around the inner ring rim.

Clause 14. The package of clause 13, any other clause, or combination of clauses, wherein the plurality of slots extend radially from the fluid passageway to an outer surface of the inner ring body.

Clause 15. The package of clause 14, any other clause, or combination of clauses, wherein each of the plurality of ribs is aligned with a corresponding one of the plurality of slots formed in the inner ring rim.

Clause 16. The package of clause 13, any other clause, or combination of clauses, wherein the outer ring rim and the inner ring rim each have an upper surface that this located above an upper surface of each of the plurality of ribs.

Clause 17. The package of clause 6, any other clause, or combination of clauses, wherein the inner cap includes an inner top wall, an inner side wall that extends downwardly from the inner top wall and that extends circumferentially around a central axis, and a plurality of engagement ridges coupled to an upper surface of the inner top wall and that are spaced circumferentially around the central axis.

Clause 18. The package of clause 17, any other clause, or combination of clauses, wherein the outer cap includes an outer top wall, an outer side wall that extends downwardly from the outer top wall and that extends circumferentially around the central axis, and a plurality of engagement tabs coupled to a lower surface of the outer top wall, Clause 19. The package of clause 118, any other clause, or combination of clauses, wherein the outer cap is movable upwardly and downwardly relative to the inner cap to change the closure from the locked position to the unlocked position, in which the outer top wall of the outer cap is moved toward the inner top wall of the inner cap and the plurality of engagement tabs are interlocked with the plurality of engagement ridges so that the inner cap rotates about the central axis with the outer cap.

Clause 20. A package comprising a container including a body and a filler neck coupled to the body and being formed to include a mouth that opens into an interior product-storage region defined by the body.

Clause 21. The package of clause 20, any other clause, or combination of clauses, further comprising a closure configured to mount to the filler neck of the container to block access to the interior product storage region.

Clause 22. The package of clause 21, any other clause, or combination of clauses, further comprising an anti-suction valve mounted to the filler neck to cover the mouth, the anti-suction valve including a lower surface arranged below the mouth, an upper surface arranged at or above the mouth and a fluid passageway extending from the upper surface and opening into the interior product-storage region.

Clause 23. The package of clause 22, any other clause, or combination of clauses, wherein the anti-suction valve is formed to provide a plurality of airflow recesses between the lower surface and the upper surface that are configured to minimize formation of a complete seal between a user's mouth and the upper surface so that sufficient suction is blocked that would remove fluid through the fluid passageway.

Clause 24. The package of clause 23, any other clause, or combination of clauses, wherein the anti-suction valve includes an outer ring engaged with the filler neck, an inner ring defining the fluid passageway and a plurality of ribs that extend radially from the central axis to interconnect the inner ring and the outer ring.

Clause 25. The package of clause 24, any other clause, or combination of clauses, wherein the plurality of ribs are spaced apart circumferentially from one another to provide the plurality of airflow recesses therebetween.

Clause 26. The package of clause 25, any other clause, or combination of clauses, wherein the outer ring includes an outer ring rim that extends circumferentially around a perimeter of the mouth, an outer ring floor that provides the lower surface of the anti-suction valve and is coupled to the inner ring, and an outer ring body that extends between the outer ring rim and the outer ring floor and engages the filler neck to retain the anti-suction valve to the filler neck.

Clause 27. The package of clause 26, any other clause, or combination of clauses, wherein the outer ring rim is formed to include a first plurality of channels that are spaced circumferentially around the central axis and that extend from an inner edge of the outer ring rim that bounds the plurality of airflow recesses toward an outer edge of the outer ring rim.

Clause 28. The package of clause 27, any other clause, or combination of clauses, wherein the outer ring rim is formed to include a second plurality of channels that are spaced circumferentially around the central axis and that extend from the outer edge of the outer ring rim toward the inner edge of the outer ring rim.

Clause 29. The package of claim 28, any other clause, or combination of clauses, wherein the filler neck has an outer surface that is formed to include a plurality of axially-extending slots relative to the central axis and at least one of the slots included in the second plurality of channels formed in the outer ring rim is aligned with one of the axially-extending slots.

Clause 30. The package of claim 7, any other clause, or combination of clauses, wherein the inner ring includes an inner ring rim defining an inlet aperture that opens into the fluid passageway and is adapted to receive a syringe and an inner ring body that extends between the inner ring rim and the outer ring floor.

Clause 31. The package of claim 30, any other clause, or combination of clauses, wherein the inner ring rim is formed to include a plurality of slots that are spaced apart from one another circumferentially around the inner ring rim, Clause 32. The package of claim 31, any other clause, or combination of clauses, wherein the plurality of slots extend radially from the fluid passageway to an outer surface of the inner ring body.

Clause 33. The package of clause 32, any other clause, or combination of clauses, wherein the outer ring rim and the inner ring rim each have and upper surface that this located above an upper surface of each of the plurality of ribs.

Clause 34. The closure of clause 23, any other clause, or combination of clauses, wherein the closure includes an inner cap configured to mount to the filler neck and an outer cap defining an interior region that receives the inner cap and cooperates with the inner cap to provide a child-resistant closure configured to block access to the interior product storage region until an unlocking force is applied on the outer cap to allow for removal of the closure from the filler neck.

Clause 35. The closure of clause 34, any other clause, or combination of clauses, wherein the inner cap includes an inner top wall, an inner side wall that extends downwardly from the inner top wall and that extends circumferentially around a central axis, and a plurality of engagement ridges coupled to an upper surface of the inner top wall and that are spaced circumferentially around the central axis.

Clause 36. The closure of clause 35, any other clause, or combination of clauses, wherein the outer cap includes an outer top wall, an outer side wall that extends downwardly from the outer top wall and that extends circumferentially around the central axis, and a plurality of engagement tabs coupled to a lower surface of the outer top wall, Clause 37. The closure of clause 36, any other clause, or combination of clauses, wherein the outer cap is movable upwardly and downwardly relative to the inner cap to change the closure from a locked position in which the outer cap is rotatable about the central axis relative to the inner cap, and an unlocked position, in which the outer top wall of the outer cap is moved toward the inner top wall of the inner cap and the plurality of engagement tabs are interlocked with the plurality of engagement ridges so that the inner cap rotates about the central axis with the outer cap Clause 38. An anti-suction valve for a child-resistant container, the anti-suction valve comprising an outer ring that extends circumferentially around a central axis and is configured to engage a filler neck of the container.

Clause 39. The anti-suction valve of clause 38, any other clause, or combination of clauses, further comprising an inner ring spaced radially inward from the outer ring relative to the central axis, the inner ring defining a fluid passageway that extends from a first end of the anti-suction valve to a second end of the anti-suction valve.

Clause 40. The anti-suction valve of clause 39, any other clause, or combination of clauses, further comprising a plurality of ribs that extend radially away from the inner ring toward the outer ring relative to the central axis to interconnect the inner ring and the outer ring.

Clause 41. The anti-suction valve of clause 40, any other clause, or combination of clauses, wherein the plurality of ribs provide a plurality of airflow recesses that are arranged to extend from the first end toward the second end and are configured to minimize formation of a complete seal between a child's mouth and surfaces of the anti-suction valve at the first end so that sufficient suction to remove fluid through the fluid passageway is blocked.

Clause 42. The anti-suction valve of clause 41, any other clause, or combination of clauses, wherein the plurality of ribs are spaced apart circumferentially from one another to provide the plurality of airflow recesses therebetween.

Clause 43. The anti-suction valve of clause 42, any other clause, or combination of clauses, wherein the outer ring includes an outer ring rim that extends circumferentially around a perimeter of the mouth, an outer ring floor that provides a lower surface of the anti-suction valve and is coupled to the inner ring, and an outer ring body that extends between the outer ring rim and the outer ring floor and engages the filler neck to retain the anti-suction valve to the filler neck, Clause 44. The anti-suction valve of clause 43, any other clause, or combination of clauses, wherein the inner ring includes an inner ring rim defining an inlet aperture that opens into the fluid passageway and is adapted to receive a syringe and an inner ring body that extends between the inner ring rim and the outer ring floor.

Clause 45. The anti-suction valve of clause 43, any other clause, or combination of clauses, wherein the inner ring rim is formed to include a plurality of slots that are spaced apart from one another circumferentially around the inner ring rim.

The invention claimed is:

1. An anti-suction valve for a child-resistant container, the anti-suction valve comprising an outer ring that extends circumferentially around a central axis and is configured to engage a filler neck of the container, an inner ring spaced radially inward from the outer ring relative to the central axis, the inner ring defining a fluid passageway that extends from a first end of the anti-suction valve to a second end of the anti-suction valve, and a plurality of ribs that extend radially away from the inner ring toward the outer ring relative to the central axis to interconnect the inner ring and the outer ring, wherein the plurality of ribs at least partially define a plurality of airflow recesses that are arranged to extend from the first end toward the second end and are configured to minimize formation of a complete seal between a child's mouth and surfaces of the anti-suction valve at the first end so that sufficient suction to remove fluid through the fluid passageway is blocked, the plurality of ribs spaced apart circumferentially from one another to provide the plurality of airflow recesses therebetween.

2. The anti-suction valve of claim 1, wherein the outer ring includes an outer ring rim, an outer ring floor that provides a lower surface of the anti-suction valve and is coupled to the inner ring, and an outer ring body that extends between the outer ring rim and the outer ring floor and engages the filler neck to retain the anti-suction valve to the filler neck, and wherein the inner ring includes an inner ring rim defining an inlet aperture that opens toward the fluid passageway and is adapted to receive a syringe and an inner ring body that extends between the inner ring rim and the outer ring floor.

3. The anti-suction valve of claim 2, wherein the inner ring rim is formed to include a plurality of slots that are spaced apart from one another circumferentially around the inner ring rim.

4. The anti-suction valve of claim 3, wherein at least one of the plurality of slots is aligned circumferentially with one of the plurality ribs.

5. The anti-suction valve of claim 2, wherein the outer ring rim is formed to include a plurality of channels that are spaced circumferentially around the central axis and that extend from an inner edge of the outer ring rim that bounds the plurality of airflow recesses toward an outer edge of the outer ring rim.

6. The anti-suction valve of claim 1, wherein the inner ring is formed to include a plurality of slots that open upwardly away from the anti-suction valve and that are spaced apart from one another circumferentially around the central axis.

7. The anti-suction valve of claim 6, wherein the outer ring is formed to include a plurality of channels that are spaced circumferentially around the central axis and that extend outwardly from an inner edge of the outer ring that bounds the plurality of airflow recesses toward an outer edge of the outer ring.

8. An anti-suction valve for a child-resistant container, the anti-suction valve comprising an outer ring that extends circumferentially around a central axis and is configured to engage a filler neck of the container, an inner ring spaced radially inward from the outer ring relative to the central axis, the inner ring at least partially defining a fluid passageway that extends from a first end of the anti-suction valve to a second end of the anti-suction valve, and a plurality of ribs that extend radially away from the inner ring toward the outer ring relative to the central axis to interconnect the inner ring and the outer ring, wherein the plurality of ribs are spaced apart circumferentially from one another to at least partially define a plurality of airflow recesses therebetween.

9. The anti-suction valve of claim 8, wherein the inner ring is formed to include a plurality of slots that open upwardly away from the anti-suction valve and that are spaced apart from one another circumferentially around the central axis.

10. The anti-suction valve of claim 8, wherein the outer ring is formed to include a plurality of channels that are spaced circumferentially around the central axis and that extend outwardly from an inner edge of the outer ring that bounds the plurality of airflow recesses toward an outer edge of the outer ring.

11. The anti-suction valve of claim 8, wherein the outer ring includes an outer ring rim, an outer ring floor that provides a lower surface of the anti-suction valve and is coupled to the inner ring, and an outer ring body that extends between the outer ring rim and the outer ring floor and engages the filler neck to retain the anti-suction valve to the filler neck, and wherein the inner ring includes an inner ring rim defining an inlet aperture that opens toward the fluid passageway and is adapted to receive a syringe and an inner ring body that extends between the inner ring rim and the outer ring floor.

12. The anti-suction valve of claim 11, wherein the inner ring rim is formed to include a plurality of slots that are spaced apart from one another circumferentially around the inner ring rim.

13. The anti-suction valve of claim 12, wherein the outer ring rim is formed to include a plurality of channels that are spaced circumferentially around the central axis and that extend from an inner edge of the outer ring rim that bounds the plurality of airflow recesses toward an outer edge of the outer ring rim.

14. The anti-suction valve of claim 12, wherein at least one of the plurality of slots is aligned circumferentially with one of the plurality ribs.

15. An anti-suction valve for a child-resistant container, the anti-suction valve comprising an outer ring that extends circumferentially around a central axis and is configured to engage a filler neck of the container, and an inner ring spaced radially inward from the outer ring relative to the central axis, the inner ring defining a fluid passageway that extends from a first end of the anti-suction valve to a second end of the anti-suction valve, wherein the anti-suction valve is formed to include at least one airflow recess arranged between the outer ring and the inner ring, and wherein at least one of the inner ring and the outer ring is formed to include at least one slot that opens upwardly away from the anti-suction valve to minimize formation of a complete seal between a child's mouth and surfaces of the anti-suction valve so that sufficient suction to remove fluid through the fluid passageway is blocked.

16. The anti-suction valve of claim 15, further comprising a plurality of ribs that extend radially away from the inner ring toward the outer ring relative to the central axis to interconnect the inner ring and the outer ring, wherein the plurality of ribs are spaced apart circumferentially from one another to at least partially define a plurality of airflow recesses therebetween.

17. The anti-suction valve of claim 15, wherein the inner ring is formed to include a plurality of slots that open upwardly away from the anti-suction valve and that are spaced apart from one another circumferentially around the central axis.

18. The anti-suction valve of claim 17, wherein the outer ring is formed to include a plurality of channels that are spaced circumferentially around the central axis and that extend outwardly from an inner edge of the outer ring that bounds the plurality of airflow recesses toward an outer edge of the outer ring.

19. The anti-suction valve of claim 15, wherein the outer ring includes an outer ring rim, an outer ring floor that provides a lower surface of the anti-suction valve and is coupled to the inner ring, and an outer ring body that extends between the outer ring rim and the outer ring floor and engages the filler neck to retain the anti-suction valve to the filler neck, and wherein the inner ring includes an inner ring rim defining an inlet aperture that opens toward the fluid passageway and is adapted to receive a syringe and an inner ring body that extends between the inner ring rim and the outer ring floor.

20. The anti-suction valve of claim 19, wherein the inner ring rim is formed to include a plurality of slots that are spaced apart from one another circumferentially around the inner ring rim.

* * * * *